US012680290B2

(12) United States Patent
Horiuchi

(10) Patent No.: US 12,680,290 B2
(45) Date of Patent: Jul. 14, 2026

(54) ASSEMBLED STRUCTURE

(71) Applicant: Chromos Inc., Tokyo (JP)

(72) Inventor: Kohei Horiuchi, Tokyo (JP)

(73) Assignee: Chromos Inc., Tokyo (JP)

( * ) Notice: Subject to any disclaimer, the term of this patent is extended or adjusted under 35 U.S.C. 154(b) by 161 days.

(21) Appl. No.: 18/671,249

(22) Filed: May 22, 2024

(65) Prior Publication Data

US 2024/0309629 A1     Sep. 19, 2024

Related U.S. Application Data

(63) Continuation of application No. PCT/JP2023/025540, filed on Jul. 11, 2023.

(30) Foreign Application Priority Data

Oct. 26, 2022     (JP) .................................. 2022171837

(51) Int. Cl.
E04B 1/19 (2006.01)
A47B 47/00 (2006.01)
(Continued)

(52) U.S. Cl.
CPC ........ E04B 1/1912 (2013.01); A47B 47/0016 (2013.01); F16B 7/0426 (2013.01);
(Continued)

(58) Field of Classification Search
CPC ............... A47B 47/0016; E04B 1/1912; E04B 2001/1963; E04B 2001/1984;
(Continued)

(56) References Cited

U.S. PATENT DOCUMENTS 4,313,687 A * 2/1982 Martinez Apeztegui ....................
F16B 7/18
403/171
5,095,677 A * 3/1992 Godbout ................. F16B 12/32
403/176
(Continued)

FOREIGN PATENT DOCUMENTS

DE        19528362 A1     2/1996
DE     102008039852 A1     3/2010
(Continued)

OTHER PUBLICATIONS

Japan Patent Office , "International Search Report", PCT/JP2023/025540, Sep. 26, 2023, 7 pages.
(Continued)

*Primary Examiner* — Jessie T Fonseca
(74) *Attorney, Agent, or Firm* — Blanchard Horton PLLC

(57) ABSTRACT

An assembled structure includes a joint member including a first opening arranged on a first surface, a second opening arranged on a second surface adjacent to the first surface, and a third opening arranged on a third surface adjacent to the first surface and arranged at a position corresponding to the second surface, a first frame member inserted into the first opening and having a first convex portion at an end portion in a longitudinal direction, a second frame member inserted into the second opening and having a second convex portion at an end portion, and a fixing member inserted into the third opening and fixing the first frame member and the second frame member.

12 Claims, 14 Drawing Sheets

100A

(51) Int. Cl.

| | |
|---|---|
| *F16B 7/04* | (2006.01) |
| *F16B 7/18* | (2006.01) |
| *F16B 12/20* | (2006.01) |
| *F16B 12/32* | (2006.01) |
| *F16B 12/40* | (2006.01) |
| *F16B 7/20* | (2006.01) |
| *F16B 12/14* | (2006.01) |

(52) U.S. Cl.
 CPC ............... *F16B 7/18* (2013.01); *F16B 7/185* (2013.01); *F16B 12/20* (2013.01); *F16B 12/32* (2013.01); *F16B 12/40* (2013.01); *E04B 2001/1963* (2013.01); *E04B 2001/1984* (2013.01); *F16B 7/20* (2013.01); *F16B 12/14* (2013.01)

(58) Field of Classification Search
 CPC .......... F16B 7/0426; F16B 7/18; F16B 7/185; F16B 7/20; F16B 12/14; F16B 12/20; F16B 12/32; F16B 12/40
 See application file for complete search history.

(56) References Cited

U.S. PATENT DOCUMENTS

| | | | | |
|---|---|---|---|---|
| 5,549,408 | A * | 8/1996 | Lo | F16B 7/0486 403/174 |
| 6,378,265 | B1 * | 4/2002 | Konstandt | E04B 1/1903 403/171 |
| 12,193,590 | B2 * | 1/2025 | Ovist | A47H 1/04 |

| | | | | | |
|---|---|---|---|---|---|
| 2004/0120759 | A1 | | 6/2004 | Altman | |
| 2019/0154079 | A1 | * | 5/2019 | Shapiro | F16B 7/185 |
| 2019/0178276 | A1 | * | 6/2019 | Hansen | E04B 1/1903 |

FOREIGN PATENT DOCUMENTS

| | | | | | |
|---|---|---|---|---|---|
| EP | 0292415 | A1 | * | 11/1988 | ............ F16B 7/0473 |
| GB | 2138195 | A | * | 10/1984 | ......... G09F 15/0068 |
| JP | S5067269 | U | | 6/1975 | |
| JP | S6099310 | U | * | 7/1985 | |
| JP | 2005155731 | A | | 6/2005 | |
| JP | 2007232167 | A | | 9/2007 | |
| JP | 2010038345 | A | | 2/2010 | |
| JP | 2021032378 | A | | 3/2021 | |
| JP | 2023025540 | A | | 2/2023 | |
| JP | 2021130850 | A | | 1/2024 | |
| KR | 20160000899 | U | | 3/2016 | |
| KR | 102046454 | B1 | * | 11/2019 | ............ A47B 96/14 |
| WO | 1989003461 | A1 | | 4/1989 | |
| WO | WO-9917634 | A1 | * | 4/1999 | ........... A47B 7/0016 |
| WO | WO-2008027021 | A1 | * | 3/2008 | ............. F16B 7/185 |
| WO | 2024/089947 | A | | 5/2024 | |

OTHER PUBLICATIONS

Japan Patent Office , "Written Opinion", International Searching Authority, PCT/JP2023/025540, Sep. 12, 2023, 8 pages.

Kosaku, Tamura , "First Office Action", Office Action dated Jan. 17, 2023 issued in JP Appl. No. 2022-171837. [JP-OA1], Jan. 17, 2023, 8.

Miyashita, Koji , "Notice of Allowance", Notice of Allowance dated Mar. 14, 2023 issued in JP Appl. No. 2022-171837. [JP-NOA], May 14, 2023, 5.

* cited by examiner

110

110

120

D2

D1

120

130

130

120A 129  127
125
123  121

D2
D1

120A 125  123
129a
129

130A

100A

130C

130D

100D

ASSEMBLED STRUCTURE

CROSS-REFERENCE TO RELATED APPLICATIONS

This application is a Continuation of International Patent Application No. PCT/JP2023/025540, filed on Jul. 11, 2023, which claims the benefit of priority to Japanese Patent Application No. 2022-171837, filed on Oct. 26, 2022, the entire contents of both are incorporated herein by reference.

FIELD

The present disclosure relates to an assembled structure.

BACKGROUND

Many assembled structures used indoors and outdoors have been sold conventionally. The assembled structure can be widely used for shelving, interior materials, and the like by combining a frame member and a joint member. An example of an assembled structure is disclosed in Japanese laid-open patent publication No. 2005-155731.

SUMMARY

According to an embodiment of the present disclosure, an assembled structure includes a joint member including a first opening arranged on a first surface, a second opening arranged on a second surface adjacent to the first surface, and a third opening arranged on a third surface adjacent to the first surface and arranged at a position corresponding to the second surface, a first frame member inserted into the first opening and having a first convex portion at an end portion in a longitudinal direction, a second frame member inserted into the second opening and having a second convex portion at an end portion, and a fixing member inserted into the third opening and fixing the first frame member and the second frame member.

According to the assembled structure, the joint member may have a hexahedral structure.

According to the assembled structure, the third opening may be arranged opposite the second opening.

According to the assembled structure, the fixing member may have a through hole in the direction of insertion into the third opening, the second convex portion may have a screw hole, and the fixing member may fix the second frame member by inserting a screw into the through hole of the fixing member and the screw hole.

According to the assembled structure, the second convex portion of the second frame member may have a screw hole at a tip portion, the fixing member may have a screw portion arranged corresponding to the screw hole, and the screw portion may be inserted into the screw hole.

According to the assembled structure, the first convex portion of the first frame member may be arranged corresponding to the fixing member, and the fixing member may fix the first frame member by engaging with the first convex portion.

According to the assembled structure, the first convex portion may protrude in a direction intersecting the longitudinal direction, the fixing member may have a concave portion at an end portion, and the concave portion and the first convex portion may be engaged.

According to the assembled structure, one surface of the first convex portion and a side surface of the concave portion may be substantially parallel to each other.

According to the assembled structure, the fixing member may have a notch arranged and extended at a position corresponding to the first surface of the joint member, and a width of the notch may be smaller than a width of the first convex portion of the first frame member.

It is possible to provide an assembled structure that can be easily assembled with a small number of components and maintain strength, by using an embodiment of the present disclosure.

DESCRIPTION OF EMBODIMENTS

Figure 1:
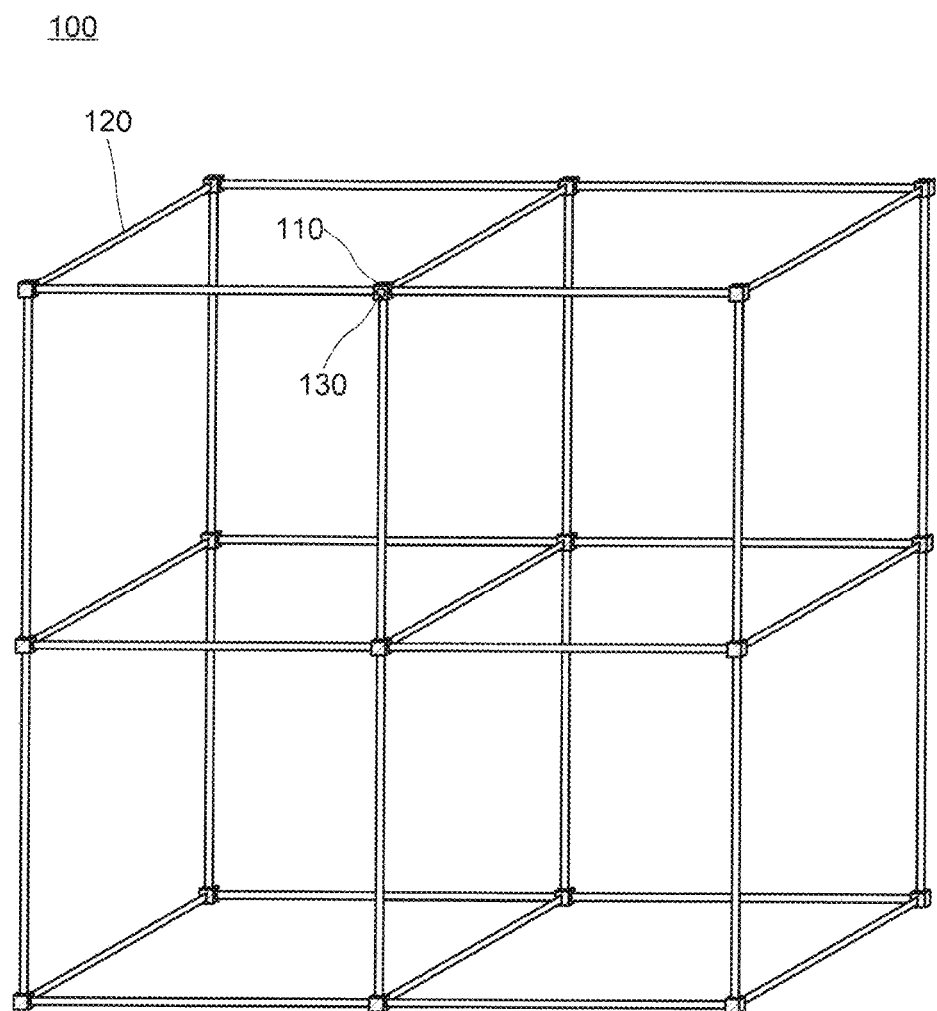
FIG. 1 is a schematic perspective view of an assembled structure according to an embodiment of the present disclosure.

Hereinafter, each embodiment of the present disclosure disclosed in the present application will be described with reference to the drawings. However, the present disclosure can be implemented in various forms without departing from the gist thereof, and should not be construed as being limited to the description of the following exemplary embodiments.

In addition, the same or similar components are denoted by the same reference signs or similar reference signs (numerals denoted only by A, B, -1, -2, and the like after the numerals) and repeated description thereof may be omitted in the drawings referred to in the present embodiment. Further, the dimensional ratio of the drawings may be different from the actual ratio, or part of the configuration may be omitted from the drawings, for the convenience of description.

Furthermore, in defining the positional relationship between one component and another component in the detailed description of the present disclosure, the terms "above" and "below" include not only the case of being positioned directly above or below one component but also the case of interposing another component therebetween, unless otherwise specified.

In the case of the assembled structure of Japanese laid-open patent publication No. 2005-155731, when each frame member (rod-shaped member) is joined to each other, a large number of screws and joining metal fittings are required depending on the number of frame members, so that there is a possibility that the member may be lost. In addition, there are many steps to attach the members, and assembly is complicated. Further, the strength of the material itself needs to be increased in order to obtain high strength (load-bearing) in the conventional assembled structure, so that the material cost is increased.

Further, in the case of a conventional assembled structure that is different from the assembled structure of Patent Literature 1, each component of the joint member may have shapes that are different depending on positions. If the component of the joint member is used in a position (corner) that is not a corresponding position, the corner protrudes. Therefore, this may impair the appearance and feel of use, making it difficult to use.

Therefore, the present disclosure discloses an assembled structure that can be easily assembled with a small number of components and can maintain strength. In addition, the present disclosure discloses an assembled structure capable of holding strength and design (appearance) without choosing a corresponding position or orientation.

First Embodiment

[1-1. Configuration of Assembled Structure 100]

FIG. 1 is a schematic diagram of an assembled structure 100 according to an embodiment of the present disclosure.

The assembled structure 100 includes a joint member 110, a frame member 120, and a fixing member 130. The frame member 120 is connected to the joint member to form a three-dimensional structure. In this example, the assembled structure 100 forms a structure in which three to five frame members 120 are combined.

[1-2. Configuration of Joint Member 110]

Figure 2:
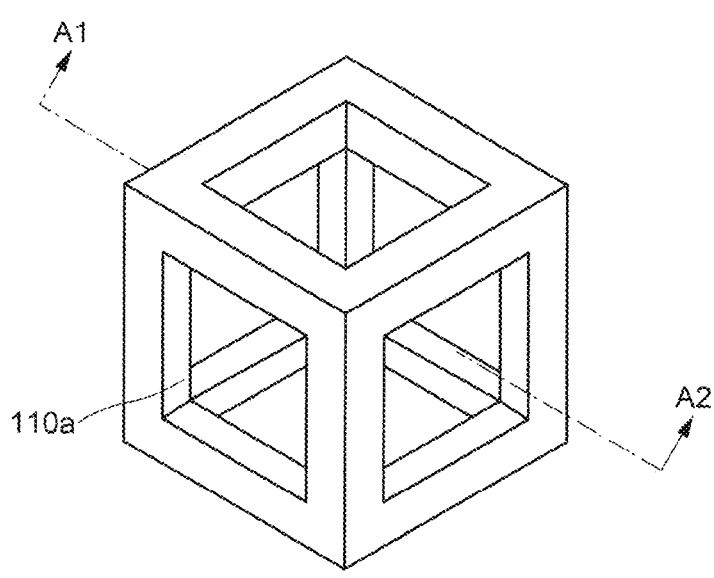
FIG. 2 is a schematic perspective view of a component of an assembled structure according to an embodiment of the present disclosure.
Figure 3:
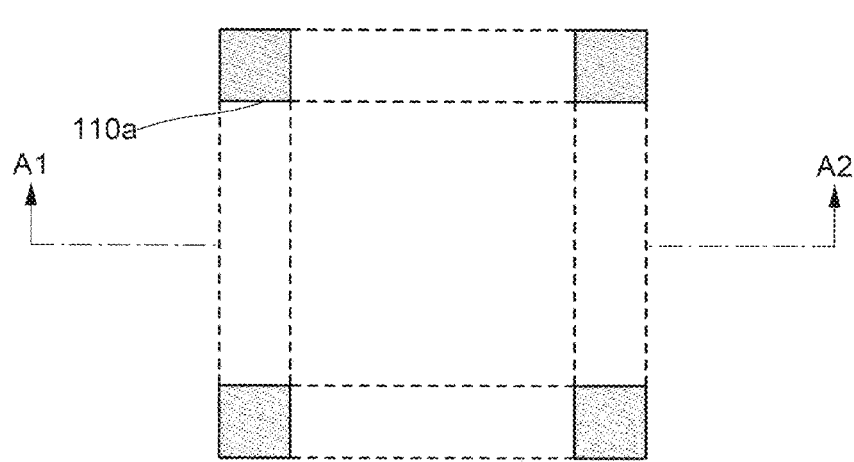
FIG. 3 is a schematic cross-sectional view of a component of an assembled structure according to an embodiment of the present disclosure.

FIG. 2 is a schematic perspective view of the joint member 110. FIG. 3 is a schematic cross-sectional view between A1-A2 of the joint member 110. The joint member 110 has a hexahedral structure (more specifically, a cubic structure) having six surfaces. In addition, corner portions of the joint member 110 may be chamfered as appropriate. Each surface can be said to be adjacent to four surfaces except the opposing surfaces in this case. An opening 110a is formed on each surface of the joint member 110. In addition, the inside of the joint member 110 is a cavity. In this case, the opening 110a has a square. In addition, corners of the opening 110a may have an R-shape in terms of processing.

[1-3. Configuration of Frame Member 120]

Figure 4:
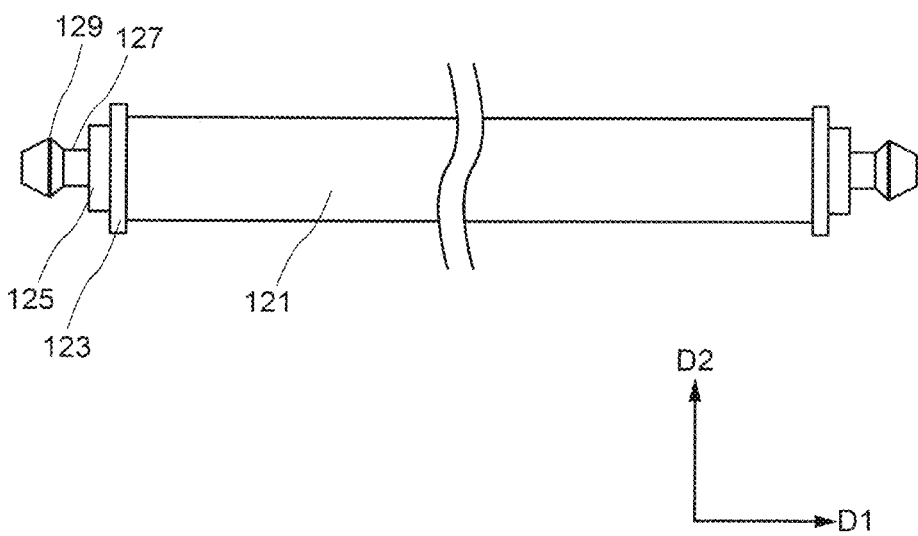
FIG. 4 is a schematic side view of a component of an assembled structure according to an embodiment of the present disclosure.
Figure 5:
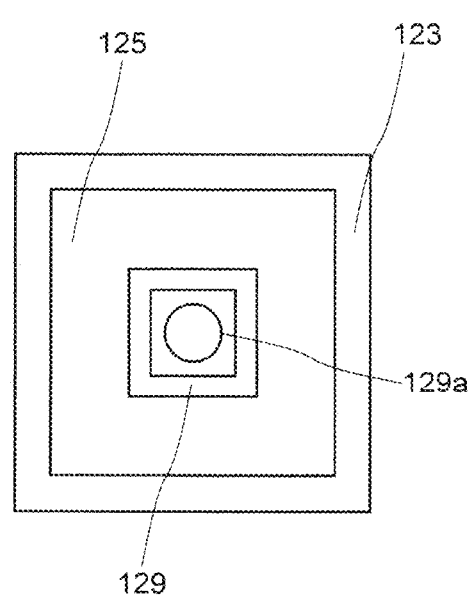
FIG. 5 is a schematic plan view of a component of an assembled structure according to an embodiment of the present disclosure.

FIG. 4 is a schematic side view of the frame member 120. FIG. 5 is a schematic plan view of the frame member 120. The frame member 120 is a rod-shaped (columnar) member extending in a longitudinal direction (also referred to as a first direction D1 or an extending direction). Specifically, the frame member 120 includes a first columnar portion 121, an annular convex portion 123, a second columnar portion 125, a third columnar portion 127, and a tip convex portion 129 (also simply referred to as "convex portion"). The annular convex portion 123, the second columnar portion 125, the third columnar portion 127, and the tip convex portion 129 are arranged at both ends of the first columnar portion 121. The annular convex portion 123, the second columnar portion 125, the third columnar portion 127, and the tip convex portion 129 are contiguously arranged in this order so as to be separated from the first columnar portion 121. As shown in FIG. 5, the first columnar portion 121, the annular convex portion 123, the second columnar portion 125, the third columnar portion 127, and the tip convex portion 129 have a quadrilateral (square) shape when viewed from the longitudinal direction (the first direction D1 (plane)), in the present embodiment.

The first columnar portion 121 has a square pole shape. A length of the first columnar portion 121 can be appropriately adjusted according to the size of the assembled structure 100. The annular convex portion 123 is arranged in an annular shape corresponding to the first columnar portion 121. The second columnar portion 125 has a width sufficient to be inserted into the joint member 110. The annular convex portion 123 is arranged larger than the second columnar portion 125 when viewed from the plane. As a result, the annular convex portion 123 has a function of a stopper when the frame member 120 is inserted into the joint member 110. Widths of the third columnar portion 127 and the tip convex portion 129 are smaller than the width of the second columnar portion 125 in relation to engaging the fixing member 130. The tip convex portion 129 has a convex structure protruding in a second direction D2 that intersects (in this case, is perpendicular to) the longitudinal direction (the first direction D1). The width of the tip convex portion 129 is larger than the width of the third columnar portion 127. Therefore, the tip convex portion 129 has a shape that protrudes from the third columnar portion 127. In addition, a screw hole 129*a* is arranged in the tip convex portion 129. Further, a width of the frame member 120 is smaller than a width of one surface of the joint member 110, in the present embodiment.

[1-4. Configuration of Fixing Member 130]

Figure 6:
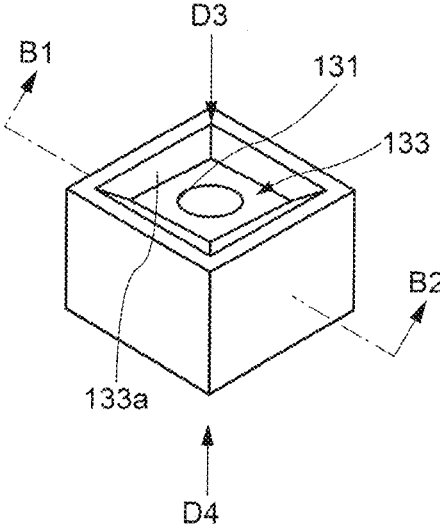
FIG. 6 is a schematic perspective view of a component of an assembled structure according to an embodiment of the present disclosure.
Figure 7:
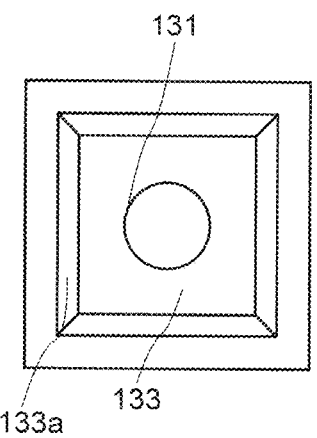
FIG. 7 is a schematic plan view showing an assembled structure according to an embodiment of the present disclosure.
Figure 8:
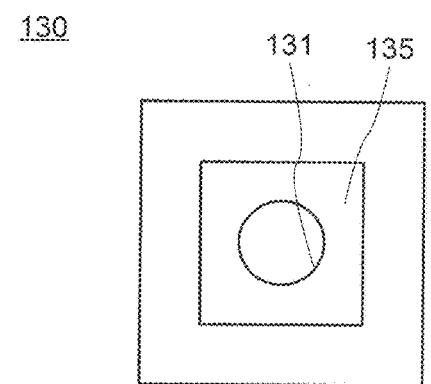
FIG. 8 is a schematic plan view showing an assembled structure according to an embodiment of the present disclosure.
Figure 9:
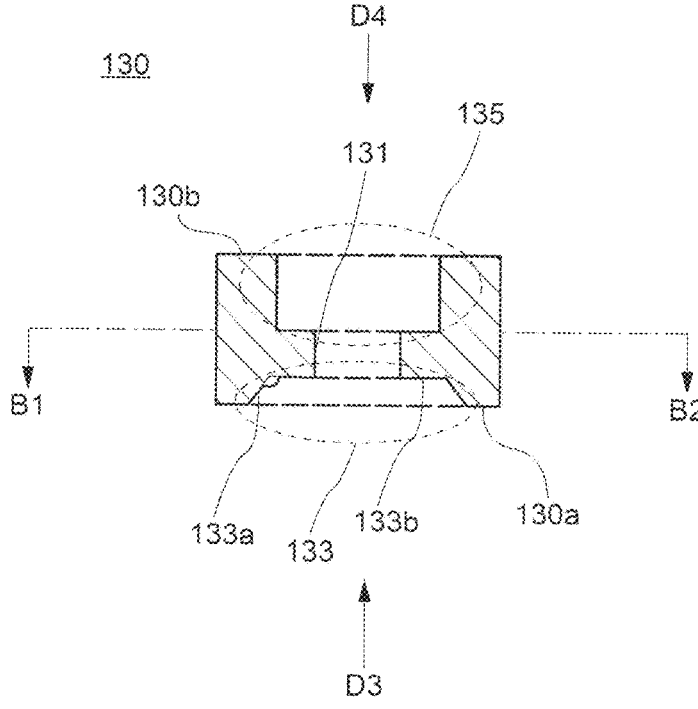
FIG. 9 is a schematic cross-sectional view showing an assembled structure according to an embodiment of the present disclosure.

FIG. 6 is a schematic perspective view of the fixing member 130. FIG. 7 is a schematic plan view of the fixing member 130 viewed from a third direction D3. FIG. 8 is a schematic plan view of the fixing member 130 viewed from a fourth direction D4 opposite to the third direction D3. FIG. 9 is a schematic cross-sectional view between B1-B2 of the fixing member 130. The fixing member 130 is arranged by being inserted into the joint member 110. The fixing member 130 has a shape corresponding to the opening 110*a* of the joint member 110. In this example, the fixing member 130 has a square when viewed from the third direction D3 and the fourth direction D4. The fixing member 130 has a through hole 131 in an extending direction (a direction of insertion into the joint member 110, as described below). The fixing member 130 has a first concave portion 133 (also simply referred to as "concave portion") and a second concave portion 135. The first concave portion 133 is arranged on a first surface 130*a* (to be inserted first into the joint member 110) side. The first concave portion 133 has an inclined side surface 133*a* and a bottom surface 133*b*. The second concave portion 135 is arranged on a second surface 130*b* side. The first concave portion 133 and the second concave portion 135 are arranged to face each other. The first concave portion 133, the through hole 131, and the second concave portion 135 are arranged in series.

[1-5. Assembly Method of Assembled Structure]

Figure 10:
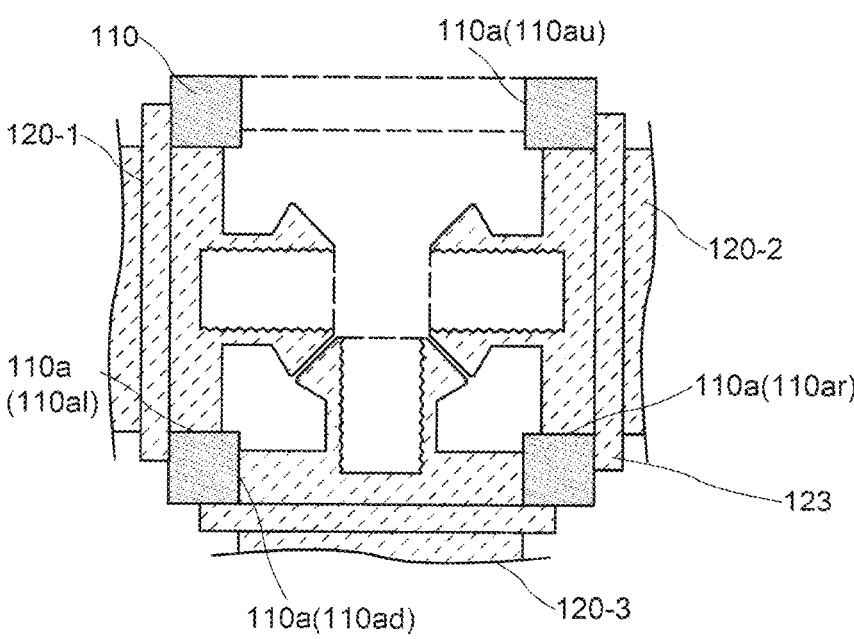
FIG. 10 is a schematic diagram showing an assembly method of an assembled structure according to an embodiment of the present disclosure.
Figure 11:
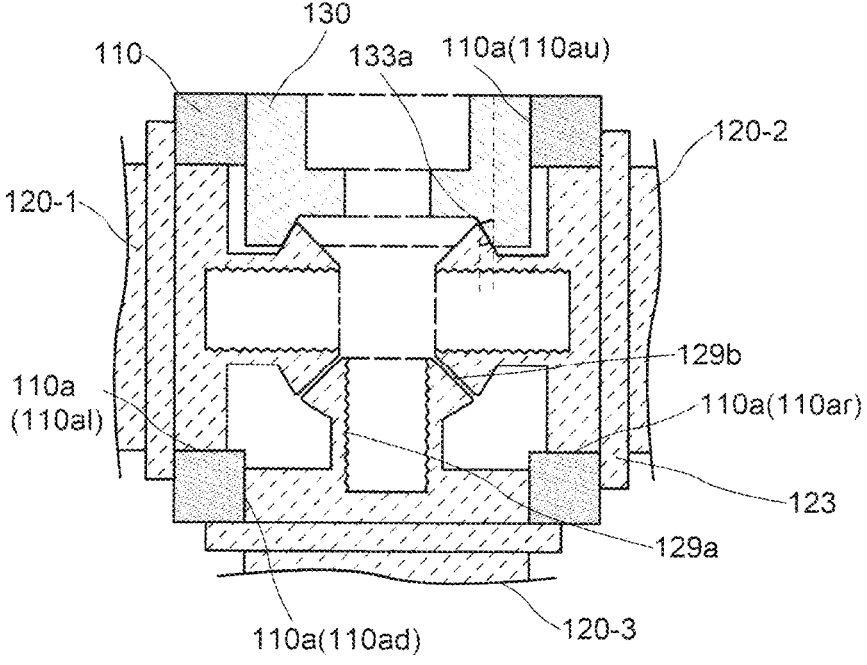
FIG. 11 is a schematic diagram showing an assembly method of an assembled structure according to an embodiment of the present disclosure.
Figure 12:
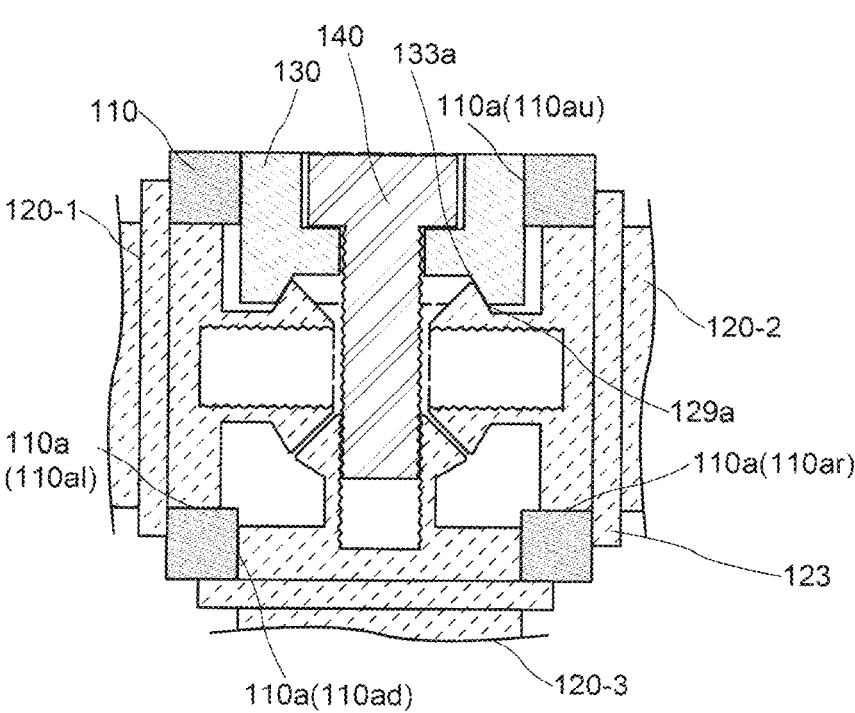
FIG. 12 is a schematic diagram showing an assembly method of an assembled structure according to an embodiment of the present disclosure.

An assembly method of the assembled structure 100 will be described below. FIG. 10 to FIG. 12 are schematic cross-sectional views illustrating the assembly method of the assembled structure 100.

As shown in FIG. 10, the frame member 120 is first inserted into the opening 110*a* of the joint member 110. A frame member 120-1 (also referred to as "first frame member") is inserted from an opening 110*al* (also referred to as "first opening") arranged on the left surface, a frame member 120-2 is inserted from an opening 110*ar* arranged on the right surface, and a frame member 120-3 (also referred to as "second frame member") is inserted from an opening 110*ad* (also referred to as "second opening") of the lower surface adjacent to the opening 110*a* of the left surface, in this example. In addition, the frame member 120 is also inserted into the opening 110*a* arranged on a surface (a surface on the front side and a surface on the back side of the paper) which is not illustrated in FIG. 10.

Next, as shown in FIG. 11, the fixing member 130 is inserted into an opening 110*au* (also referred to as a "third opening") of the upper surface facing the lower surface. In this case, the fixing member 130 engages the tip convex portion 129 of the frame member 120-1. Specifically, a side surface 129*b* of the tip convex portion 129 of the frame member 120 and the side surface 133*a* of the first concave portion 133 of the fixing member 130 are substantially parallel to each other. Therefore, the side surface 129*b* and the side surface 133*a* are in contact with or close to each other. As a result, the frame members 120-1 and 120-2 engage with the first concave portion 133 of the fixing member 130 (movement of the frame member 120 is restricted).

Next, as shown in FIG. 12, a screw 140 is inserted into the screw hole 129*a* of the lower frame member 120-3 arranged opposite the through hole 131 of the fixing member 130 and the fixing member 130. All the frame members 120 are fixed by fastening the screw 140 to the frame member 120-3. As a result, part of the assembled structure 100 is formed. Repeating this process makes it possible to manufacture the assembled structure 100.

In the conventional assembled structure, in the case where each frame member is joined to a joint member, screws or joining metal fittings are required for each frame, so that there was a possibility that the member may be lost. In addition, there were many steps to attach the members in the conventional assembled structure, which was complicated. However, since the joint member, the fixing member, and the plurality of frame members can be combined and fixed in the assembled structure of the present embodiment, the number of components can be reduced. In addition, since the number of components is small in the case of the present embodiment, the process of assembling the assembled structure can be reduced, and the assembled structure can be easily formed.

In addition, four frame members 120 are engaged with the fixing member 130 in the present embodiment. Further, the fixing member 130 and the opposing frame member 120 are fastened by the screw 140, so that all the frame members 120 are reinforced together, and the strength of the assembled structure 100 can be further increased.

Therefore, using the present embodiment makes it possible to form the assembled structure that can be easily assembled with a small number of components and has high strength.

In addition, since the joint member 110 has the same shape regardless of position by using the present embodiment, the joint member 110 can be used at any position. Further, since the width of the frame member 120 is smaller than the width of one surface of the joint member 110, there is no protruding portion. As a result, the assembled structure can be used without impairing the appearance and feel of use.

In addition, although the example in which the annular convex portion 123, the second columnar portion 125, the third columnar portion 127, and the tip convex portion 129 are arranged at both ends of the first columnar portion 121 is shown in the present embodiment, the present disclosure is not limited to this. The second columnar portion 125, the third columnar portion 127, and the tip convex portion 129 may not be arranged depending on the joining position (for example, portion corresponding to the end of the assembled structure).

Second Embodiment

An assembled structure that is different from the first embodiment will be described in the present embodiment. Specifically, an assembled structure including a joint member having a circular shape and a cylindrical shape will be described. In addition, descriptions of configurations similar to those of the first embodiment will be omitted as appropriate.

[Configuration of Assembled Structure 100A]

Figure 13:
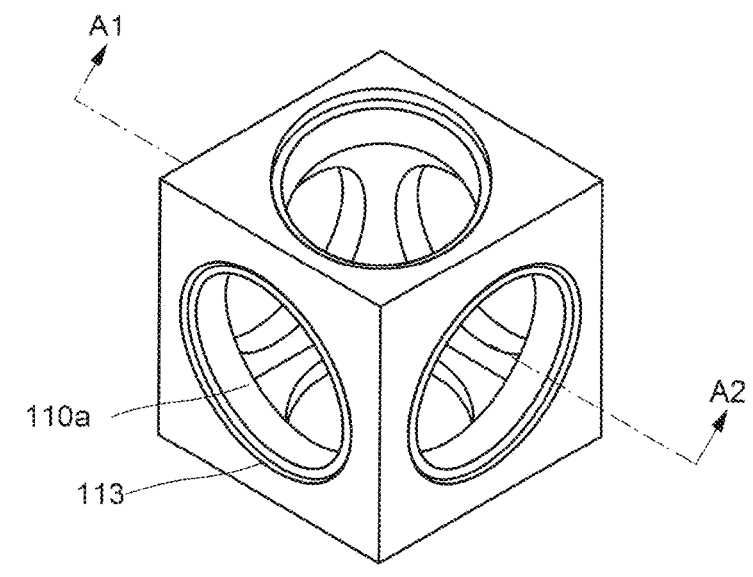
FIG. 13 is a schematic perspective view of a component of an assembled structure according to an embodiment of the present disclosure.
Figure 14:
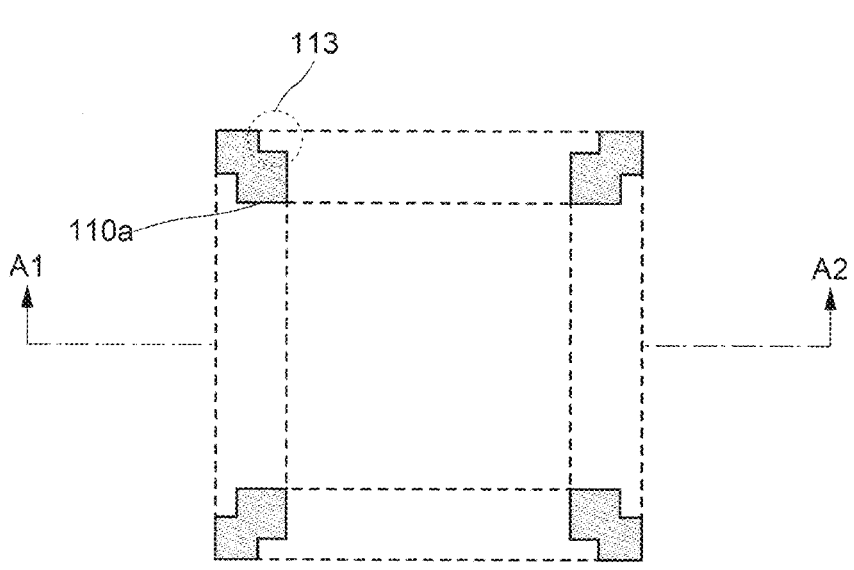
FIG. 14 is a schematic cross-sectional view of a component of an assembled structure according to an embodiment of the present disclosure.
Figures 15, 16:
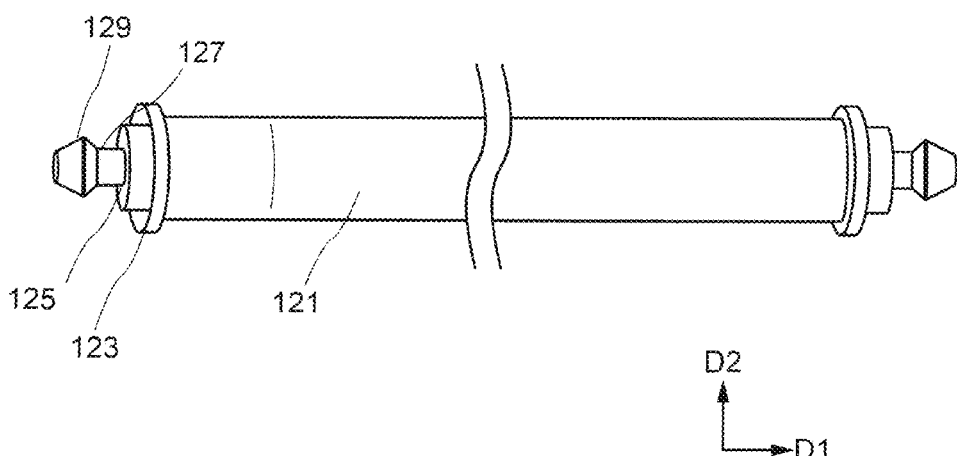
FIG. 15 is a schematic perspective view of a component of an assembled structure according to an embodiment of the present disclosure.
FIG. 16 is a schematic plan view of a component of an assembled structure according to an embodiment of the present disclosure.
Figure 17:
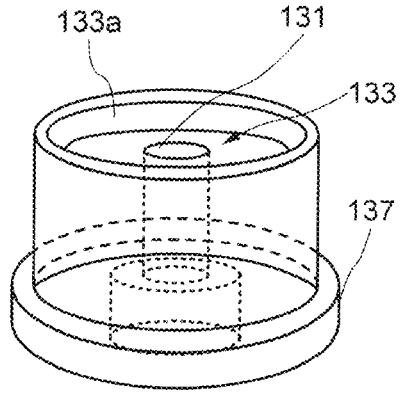
FIG. 17 is a schematic perspective view of a component of an assembled structure according to an embodiment of the present disclosure.
Figure 18:
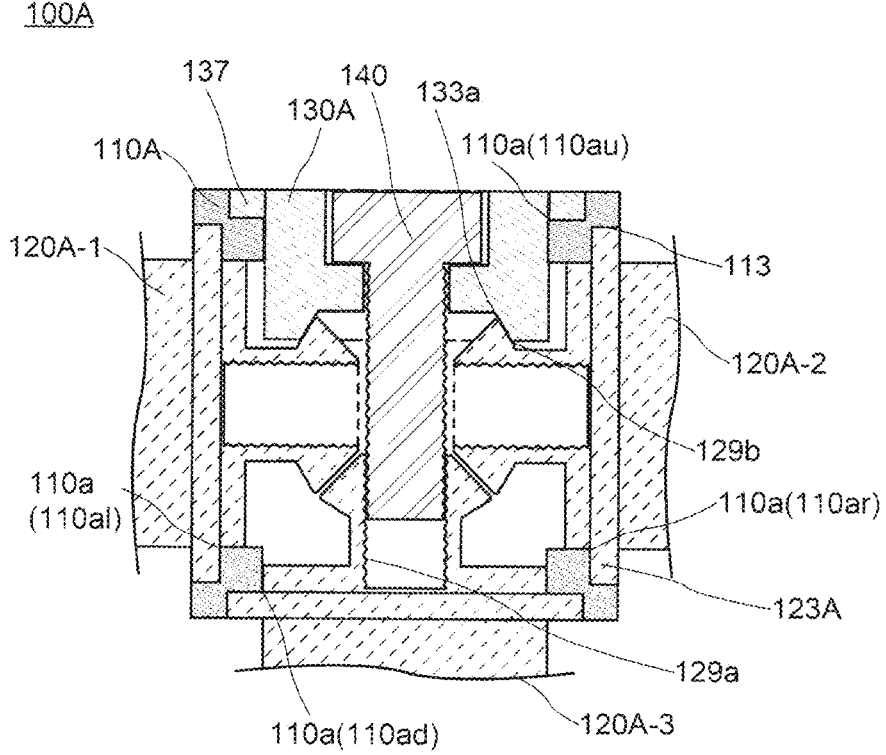
FIG. 18 is a schematic diagram showing an assembly method of an assembled structure according to an embodiment of the present disclosure.

FIG. 13 is a schematic perspective view of a joint member 110A according to the present embodiment. FIG. 14 is a schematic cross-sectional view of the joint member 110A according to the present embodiment. FIG. 15 is a schematic perspective view of a frame member 120A according to the present embodiment. FIG. 16 is a schematic plan view of the frame member 120A according to an embodiment of the present disclosure. FIG. 17 is a schematic plan view of a fixing member 130A according to the present embodiment. FIG. 18 is a schematic diagram showing an assembly method of an assembled structure 100A according to the present embodiment.

The assembled structure 100A includes the joint member 110A, the frame member 120A, and the fixing member 130A, in the present embodiment.

The joint member 110A has a circular opening 110a on each surface as shown in FIG. 13 and FIG. 14. In addition, the inside of the joint member 110A is a cavity. The opening 110a has a concave portion 113. The concave portion 113 is arranged contiguously with the opening 110a and is arranged on the entire opening 110a (the concave portion 113 is arranged in an annular shape).

As shown in FIG. 15 and FIG. 16, the frame member 120A includes the first columnar portion 121, the annular convex portion 123, the second columnar portion 125, the third columnar portion 127, and the tip convex portion 129. The first columnar portion 121, the second columnar portion 125, the third columnar portion 127, and the tip convex portion 129 have a cylindrical (or conical) shape. The annular convex portion 123 has an annular shape. Since the frame member 120A (the first columnar portion 121) has a cylindrical shape, a user can easily hold the frame member 120A, and corner portions are eliminated, thereby reducing the risk of injury.

As shown in FIG. 17, the fixing member 130A has an annular convex portion 137 located circumferentially at an end portion of one side surface. The annular convex portion 137 corresponds to the concave portion 113 of the joint member 110A. A width (outer diameter) of the annular convex portion 137 of the fixing member 130A in one direction is substantially the same as or smaller than a width (diameter) of the concave portion 113 of the joint member 110A in one direction. Specifically, as shown in FIG. 18, the width (diameter) of the annular portion 137 of the fixing member 130A in one direction may be smaller than the width (diameter) of the concave portion 113 of the joint member 110A in one direction so that a gap of about a few millimeters can be formed when the fixing member 130A is engaged with (inserted into) the joint member 130A.

An annular convex portion 123A of the frame member 120A and the annular convex portion 137 of the fixing member 130A are arranged in the concave portion 113 of the joint member 110A, by using the present embodiment. This makes it difficult for frame members 120A-1 and 120A-2 and the fixing member 130A to come off in the assembled structure 100A. In addition, since the number of uneven parts is reduced, a clear and sophisticated impression can be given to the user.

In addition, it is possible to prevent the fixing member 130 from excessively entering the inside of the joint member 110 (it is possible to prevent the fixing member 130 from entering the inner space and cannot be pulled out) when the fixing member 130 is inserted into the joint member 110, in the present embodiment. In addition, the annular convex portion 137 may not necessarily be arranged.

Third Embodiment

An assembled structure that is different from the second embodiment will be described in the present embodiment.

Specifically, an example in which a convex portion is included in a portion of the fixing member will be described.
[Configuration of Assembled Structure 100B]

Figure 19:
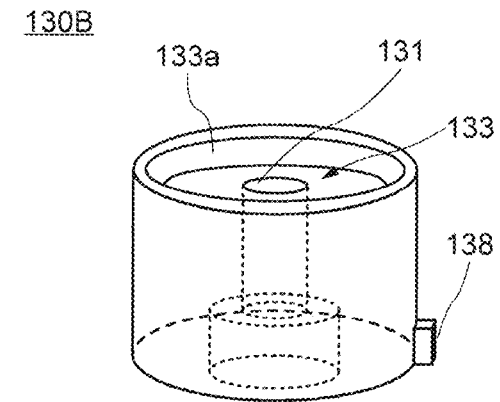
FIG. 19 is a schematic perspective view of a component of an assembled structure according to an embodiment of the present disclosure.
Figure 20:
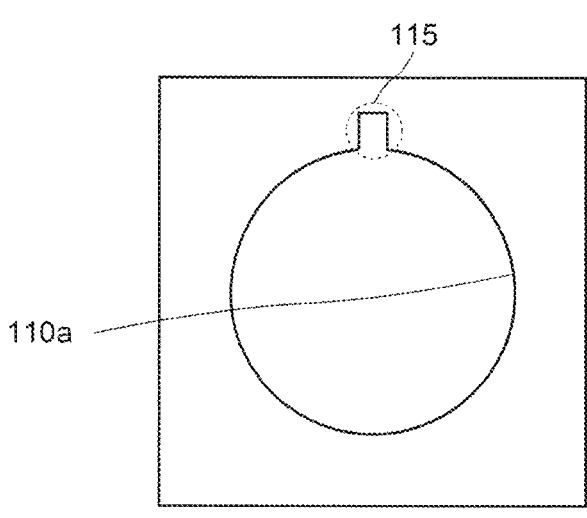
FIG. 20 is a schematic plan view of a component of an assembled structure according to an embodiment of the present disclosure.

FIG. 19 is a schematic perspective view of a fixing member 130B according to the present embodiment. FIG. 20 is a schematic plan view of a joint member 110B according to the present embodiment. As shown in FIG. 19, a convex portion 138 is partially arranged on a side surface of one end portion of the fixing member 130B.

The joint member 110B has the circular opening 110a. Further, a concave portion 115 (also referred to as a notch) is arranged so as to be contiguous with the opening 110a. The concave portion 115 of the joint member 110B has a shape corresponding to the convex portion 138 of the fixing member 130B (in other words, the concave portion 115 and the convex portion 138 have a key-to-keyhole relationship). A width of the fixing member 130B of the convex portion 138 in one direction is smaller than a width of the concave portion 115 of the joint member 110B in one direction. More specifically, it is desirable that the width of the convex portion 138 of the fixing member 130B in one direction is smaller than the width of the concave portion 115 of the joint member 110B in one direction so that a gap of about a few millimeters can be formed when the fixing member 130B is engaged with the joint member 110.

In the present embodiment, the position of the fixing member 130B is fixed by engaging the convex portion 138 of the fixing member 130B and the concave portion 115 of the joint member 110B, and an assembled structure 100B can be stabilized.

Fourth Embodiment

An assembled structure that is different from the second embodiment will be described in the present embodiment. More specifically, an example in which a notch is arranged at a position corresponding to each surface of the fixing member 130 will be described.
[Configuration of Assembled Structure 100C]

Figure 21:
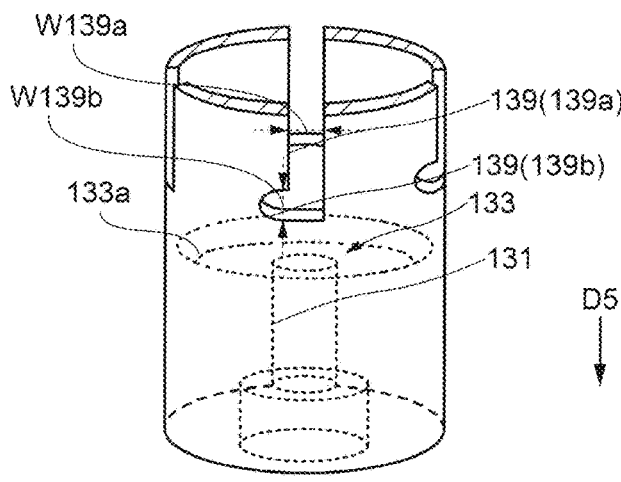
FIG. 21 is a schematic perspective view of a component of an assembled structure according to an embodiment of the present disclosure.
Figure 22:
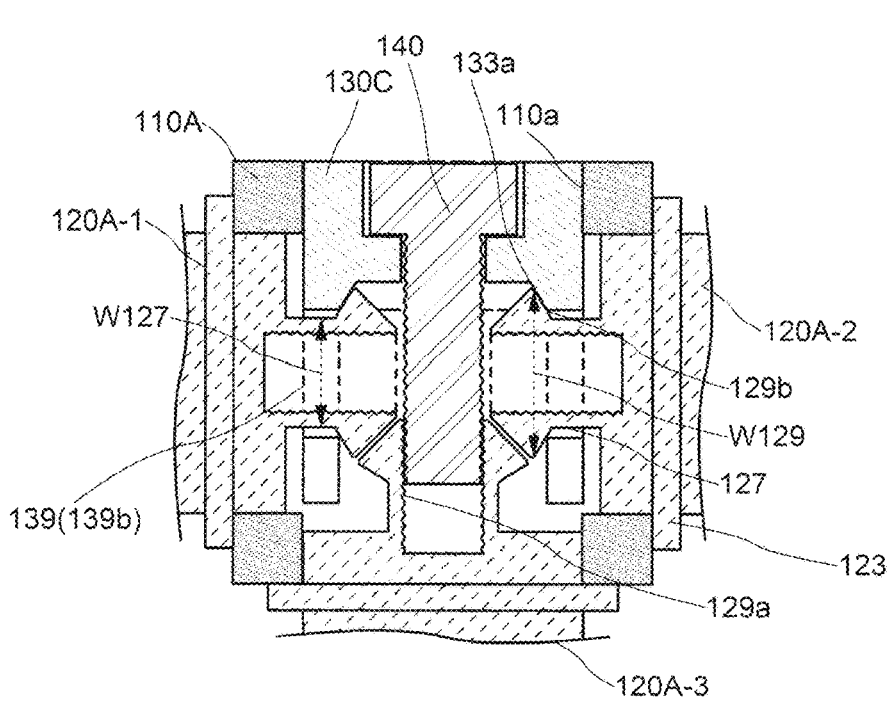
FIG. 22 is a schematic diagram showing an assembly method of an assembled structure according to an embodiment of the present disclosure.

FIG. 21 is a schematic perspective view of a fixing member 130C according to the present embodiment. FIG. 22 is a schematic diagram showing an assembly method of an assembled structure 100C according to the present embodiment. As shown in FIG. 21, the fixing member 130C extends on a side having the first concave portion 133. The fixing member 130C has a notch 139 at a position corresponding to each surface of a joint member 110C. The notch 139 includes a first notch 139a that extends in a direction (a fifth direction D5) in which the fixing member 130C extends, and a second notch 139b. The first notch 139a and the second notch 139b are arranged in series and are perpendicular to each other at a predetermined position. A width W139a of the first notch 139a and a width W139b of the second notch 139b are larger than a width W127 of the third columnar portion of the frame member 120 and smaller than a width W129 of the tip convex portion 129.

In the present embodiment, as shown in FIG. 22, the fixing member 130C is inserted into the joint member 110A after the frame members 120A-1, 120A-2, and 120A-3 are inserted into the joint member 110A. Since the fixing member 130C has the notch 139 in this case, even if the length is longer in the longitudinal direction than that of the second embodiment, the fixing member 130C can be inserted deep without touching the frame members 120A-1, 120A-2, and 120A-3. In addition, the fixing member 130C is inserted until the frame members 120A-1, 120A-2, and 120A-3 contact an end portion of the first notch 139a, in the present embodiment. Then, the fixing member 130C is turned clockwise. This operation causes the frame member 120A to contact an end portion of the second notch 139*b*. Finally, the screw 140 is inserted from the through hole 131 of the fixing member 130C to fasten the frame member 120A facing the fixing member 130C and the screw 140. In this way, part of the assembled structure 100C is completed, as described above.

Movement of the frame member 120 is suppressed by the notch 139 together with the first concave portion 133 of the fixing member 130 by using the present embodiment. Therefore, it is possible to resist a force from a direction in which the frame member 120 extends, and a direction intersecting this direction. This makes it possible to stabilize the structure of the assembled structure 100C.

Figure 23:
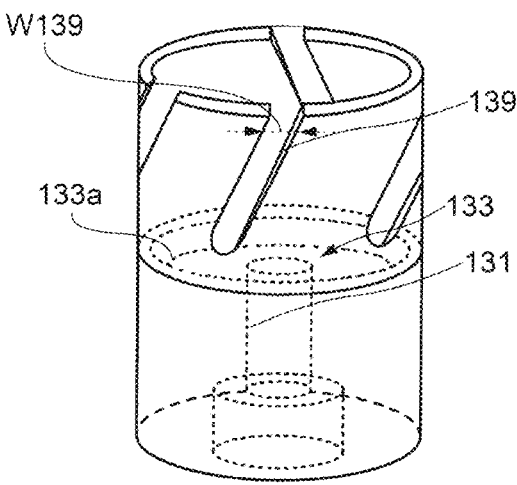
FIG. 23 is a schematic perspective view of a component of an assembled structure according to an embodiment of the present disclosure.

In addition, although the example in which the notch 139 has a shape (the first notch 139*a* and the second notch 139*b*) that extends straight in one direction (longitudinal direction) and perpendicular to each other at a predetermined position has been shown in the present embodiment, the present disclosure is not limited thereto. FIG. 23 is a schematic perspective view of another aspect of the fixing member 130C according to the present embodiment. As shown in FIG. 23, t the notch 139 may be arranged so as to extend straight in a direction (oblique direction) intersecting the direction (longitudinal direction) in which the fixing member 130C extends. A width W139 of the notch 139 is larger than the width W127 of the third columnar portion 127 of the frame member 120 and smaller than the width W129 of the tip convex portion 129. This configuration can also resist a force from the direction in which the frame member 120 extends, as in FIG. 21 and FIG. 22. This makes it possible to stabilize the construction of the assembled structure 100C.

Fifth Embodiment

An assembled structure that is different from the second embodiment will be described in the present embodiment. Specifically, an example of a fixing member in which a screw portion is arranged will be described.

[Configuration of Assembled Structure 100D]

Figure 24:
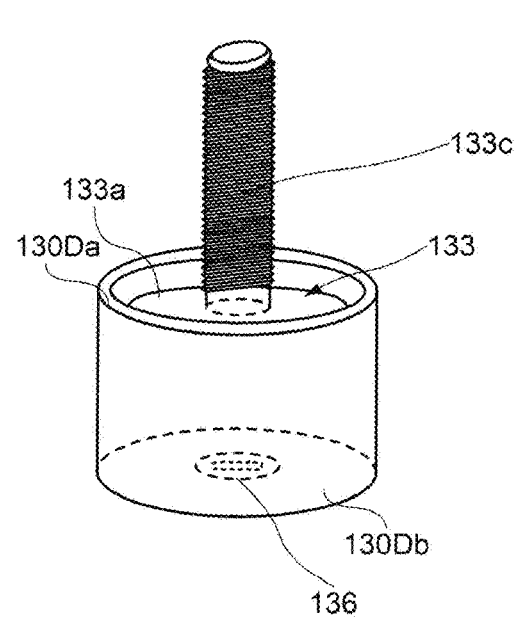
FIG. 24 is a schematic perspective view of a component of an assembled structure according to an embodiment of the present disclosure.
Figure 25:
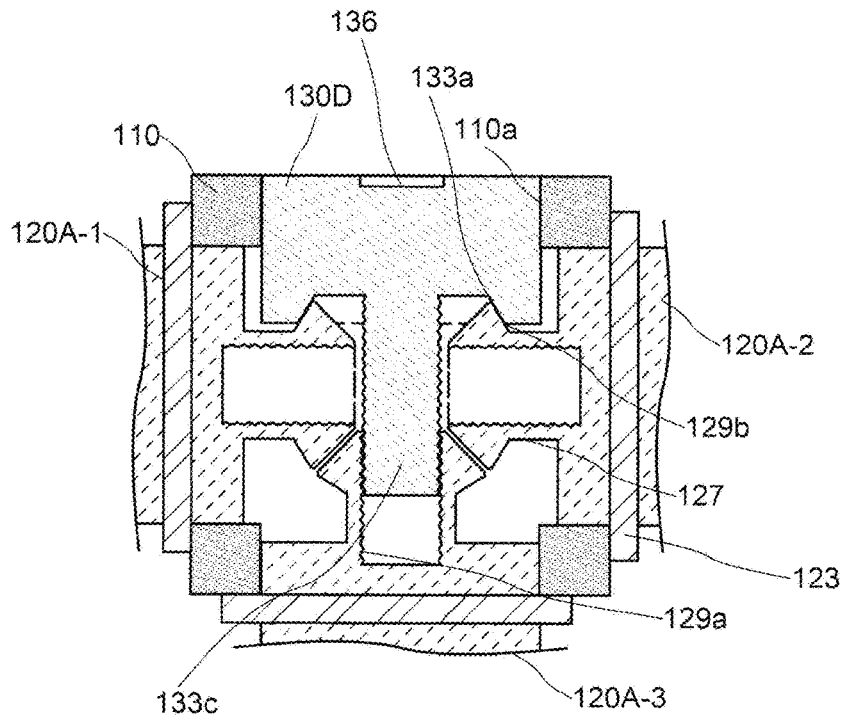
FIG. 25 is a schematic diagram showing an assembly method of an assembled structure according to an embodiment of the present disclosure.

FIG. 24 is a schematic perspective view of a fixing member 130D according to the present embodiment. FIG. 25 is a schematic diagram showing an assembly method of an assembled structure 100D according to the present embodiment.

As shown in FIG. 24, a screw portion 133*c* is arranged in the first concave portion 133 on a first surface 130Da side of the fixing member 130D. Therefore, the fixing member 130D does not have a through hole and a second concave portion. A second surface 130Db facing the first concave portion 133 may be flat or have a concave portion 136 sufficient enough to engage a tip portion of a flat-head screwdriver. As a result, as shown in FIG. 25, the screw portion 133*c* is inserted into the screw hole 129*a* of the lower frame member 120A-3 arranged opposite the fixing member 130D by inserting the fixing member 130D into the joint member 110 clockwise. As a result, all frame members 120A-1, 120A-2, and 120-A3 are fixed.

There is no need to prepare a new screw, and the assembled structure can be manufactured more easily, by using the present embodiment.

[Modifications]

Within the spirit of the present disclosure, it is understood that various modifications and changes can be made by those skilled in the art and that these modifications and changes also fall within the scope of the present disclosure. For example, the addition, deletion, or design change of components, or the addition, deletion, or condition change of processes as appropriate by those skilled in the art based on each embodiment are also included in the scope of the present disclosure as long as they are provided with the gist of the present disclosure.

Although the example in which the joint member 110 has a cubic structure as a hexahedral structure has been shown in the first embodiment of the present disclosure, the present disclosure is not limited thereto. The joint member 110 may be a cuboid. In addition, the joint member 110 is not limited to a hexahedron and may be a tetrahedron, depending on the application. Further, the joint member 110 may be a spherical structure.

Although the example in which the opening 110*a* is a square has been shown in the first embodiment of the present disclosure, the present disclosure is not limited to this. For example, the opening 110*a* may be a diamond, a parallelogram, a rectangle, or a polyhedron such as a triangle, a hexagon, or a star. In addition, although the example in which the opening is circular has been shown in the second embodiment, the present disclosure is not limited to this. The opening may be oval or otherwise curved.

What is claimed is:

1. An assembled structure comprising:
a joint member including a first opening arranged on a first surface, a second opening arranged on a second surface adjacent to the first surface, and a third opening arranged on a third surface adjacent to the first surface, the third surface arranged opposite the second surface;
a first frame member axially inserted into the first opening and having a first convex portion at an end portion in a longitudinal direction;
a second frame member inserted into the second opening and having a second convex portion at an end portion; and
a fixing member different from the joint member and inserted into the third opening and fixing the first frame member and the second frame member, wherein
the third opening is arranged opposite the second opening,
the first convex portion protrudes in a direction intersecting the longitudinal direction,
the fixing member has a first concave portion at an end portion, and
the first concave portion and the first convex portion engage.

2. The assembled structure according to claim 1, wherein the joint member has a hexahedral structure.

3. The assembled structure according to claim 1, wherein the third opening is arranged opposite the second opening.

4. The assembled structure according to claim 1, wherein the first convex portion of the first frame member is arranged corresponding to the first concave portion of the fixing member, and the first concave portion and the first convex portion are engaged.

5. The assembled structure according to claim 1, wherein one surface of the first convex portion and a side surface of the first concave portion are substantially parallel to each other.

6. The assembled structure according to claim 1, wherein the joint member has a second concave portion provided in the third opening,
the fixing member has a third convex portion provided at an end portion on a first side of a side surface so as to correspond to the second concave portion, and the second concave portion and the third convex portion engage with each other when the fixing member engages with the first convex portion.

7. An assembled structure comprising:

a joint member including a first opening arranged on a first surface, a second opening arranged on a second surface adjacent to the first surface, and a third opening arranged on a third surface adjacent to the first surface, the third surface arranged opposite the second surface;

a first frame member axially inserted into the first opening and having a first convex portion at an end portion in a longitudinal direction;

a second frame member inserted into the second opening and having a second convex portion at an end portion; and a fixing member different from the joint member and inserted into the third opening and fixing the first frame member and the second frame member, wherein the third opening is arranged opposite the second opening, the fixing member has a through hole in the direction of insertion into the third opening, the second convex portion has a screw hole, and the fixing member fixes the second frame member by inserting a screw into the through hole of the fixing member and the screw hole.

8. The assembled structure according to claim 7, wherein the joint member has a first concave portion provided in the third opening, the fixing member has a third convex portion provided at an end portion on a first side of a side surface so as to correspond to the first concave portion, and the first concave portion and the third convex portion engage with each other when the fixing member engages with the first convex portion.

9. An assembled structure comprising:

a joint member including a first opening arranged on a first surface, a second opening arranged on a second surface adjacent to the first surface, and a third opening arranged on a third surface adjacent to the first surface, the third surface arranged opposite the second surface;

a first frame member axially inserted into the first opening and having a first convex portion at an end portion in a longitudinal direction;

a second frame member inserted into the second opening and having a second convex portion at an end portion; and a fixing member different from the joint member and inserted into the third opening and fixing the first frame member and the second frame member, wherein the third opening is arranged opposite the second opening, the second convex portion of the second frame member has a screw hole at a tip portion, the fixing member has a screw portion arranged corresponding to the screw hole, and the screw portion is inserted into the screw hole.

10. The assembled structure according to claim 9, wherein the joint member has a first concave portion provided in the third opening, the fixing member has a third convex portion provided at an end portion on a first side of a side surface so as to correspond to the first concave portion, and the first concave portion and the third convex portion engage with each other when the fixing member engages with the first convex portion.

11. An assembled structure comprising:

a joint member including a first opening arranged on a first surface, a second opening arranged on a second surface adjacent to the first surface, and a third opening arranged on a third surface adjacent to the first surface, the third surface arranged opposite the second surface;

a first frame member axially inserted into the first opening and having a first convex portion at an end portion in a longitudinal direction;

a second frame member inserted into the second opening and having a second convex portion at an end portion; and a fixing member different from the joint member inserted into the third opening and fixing the first frame member and the second frame member, wherein the third opening arranged opposite the second opening, the fixing member has a notch arranged and extending at a position corresponding to the first surface of the joint member, the first frame member has a columnar portion closer to a base side than the first convex portion, the first convex portion protrudes in a direction intersecting the longitudinal direction, a width of the notch is greater than a width of the columnar portion of the first frame member in the direction intersecting the longitudinal direction, and the width of the notch is smaller than a width of the first convex portion of the first frame member in the direction intersecting the longitudinal direction.

12. The assembled structure according to claim 11, wherein the joint member has a first concave portion provided in the third opening, the fixing member has a third convex portion provided at an end portion on a first side of a side surface so as to correspond to the first concave portion, and the first concave portion and the third convex portion engage with each other when the fixing member engages with the first convex portion.

* * * * *